US012587615B2

(12) United States Patent
Fee et al.

(10) Patent No.: US 12,587,615 B2
(45) Date of Patent: Mar. 24, 2026

(54) MULTI-STREAM PEAK BANDWIDTH DISPERSAL

(71) Applicant: Tyco Fire & Security GmbH, Neuhausen am Rheinfall (CH)

(72) Inventors: Paul Fee, Belfast (GB); Gareth McCarter, Newtownards (GB); Terence Neill, Lisburn (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/315,132

(22) Filed: May 7, 2021

(65) Prior Publication Data

US 2022/0360744 A1 Nov. 10, 2022

(51) Int. Cl.
| | |
|---|---|
| *H04N 7/18* | (2006.01) |
| *G06V 20/40* | (2022.01) |
| *H04L 47/125* | (2022.01) |
| *H04L 47/127* | (2022.01) |
| *H04N 5/77* | (2006.01) |
| *H04N 5/915* | (2006.01) |
| *H04N 5/917* | (2006.01) |
| *H04N 7/12* | (2006.01) |

(52) U.S. Cl.
CPC ............. *H04N 7/181* (2013.01); *G06V 20/40* (2022.01); *H04L 47/125* (2013.01); *H04L 47/127* (2013.01); *H04N 5/77* (2013.01); *H04N 5/915* (2013.01); *H04N 5/917* (2013.01); *H04N 7/122* (2013.01); *H04N 7/188* (2013.01)

(58) Field of Classification Search
CPC .......... H04N 7/181; H04N 5/77; H04N 5/915; H04N 5/917; H04N 7/122; H04N 7/188; G06K 9/00711; H04L 47/125; H04L 47/127
See application file for complete search history.

(56) References Cited

U.S. PATENT DOCUMENTS

| | | | | |
|---|---|---|---|---|
| 10,455,194 B1 * | 10/2019 | Yang | .......................... | H04N 7/15 |
| 2011/0119716 A1 * | 5/2011 | Coleman, Sr. | ....... | H04N 21/814 |
| | | | | 725/62 |
| 2015/0095454 A1 * | 4/2015 | Shang | ................... | H04L 65/762 |
| | | | | 709/217 |
| 2017/0318068 A1 * | 11/2017 | Kikkeri Shivadatta | ...................... | |
| | | | | H04J 3/0632 |
| 2020/0084366 A1 * | 3/2020 | Fujiwara | ................ | H04R 3/005 |
| 2022/0353314 A1 * | 11/2022 | Wang | ..................... | H04L 65/75 |

* cited by examiner

*Primary Examiner* — Daniel T Tekle
(74) *Attorney, Agent, or Firm* — ArentFox Schiff LLP

(57) ABSTRACT

A system may be configured to perform multi-stream bandwidth dispersal. In some aspects, the system may receive, via a communication network, a plurality of frame collections from a video capture device and one or more other video capture devices, and detect a congestion context based upon the plurality of frame collections. Further, the system may determine a schedule notification for the video capture device, the schedule notification providing instruction for transmitting a frame of a frame collection, and transmit, via the communication network, the schedule notification to the video capture device.

23 Claims, 8 Drawing Sheets

100

Key Frame 112(3)

Key Frame 112(4)

Key Frame 112(2)

Key Frame 112(5)

Frame Collection Key frame Cycle

Key Frame 112(1)

Key Frame 112(6)

Key Frame 112(8)

Key Frame 112(7)

400

600

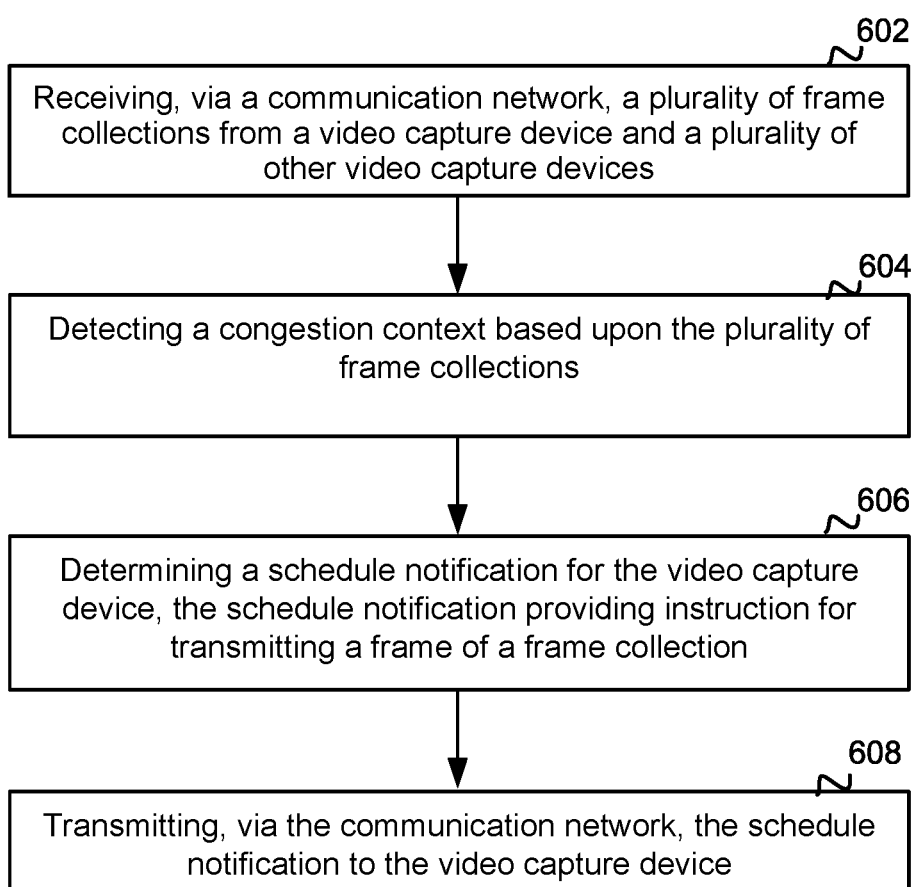

602

Receiving, via a communication network, a plurality of frame collections from a video capture device and a plurality of other video capture devices

604

Detecting a congestion context based upon the plurality of frame collections

606

Determining a schedule notification for the video capture device, the schedule notification providing instruction for transmitting a frame of a frame collection

608

Transmitting, via the communication network, the schedule notification to the video capture device

*FIG. 6*

Figure 7:
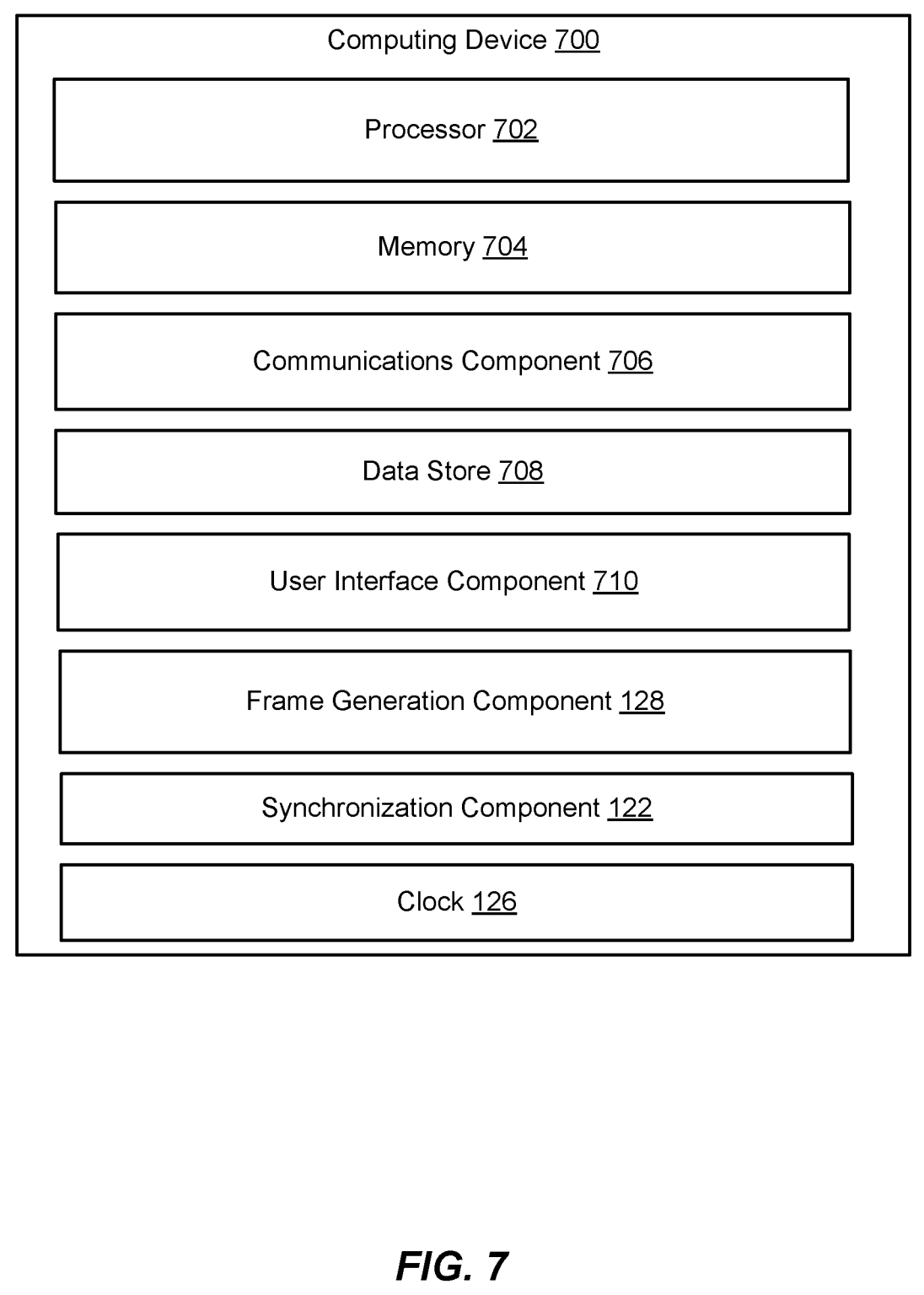

Computing Device 700

Processor 702

Memory 704

Communications Component 706

Data Store 708

User Interface Component 710

Frame Generation Component 128

Synchronization Component 122

Clock 126

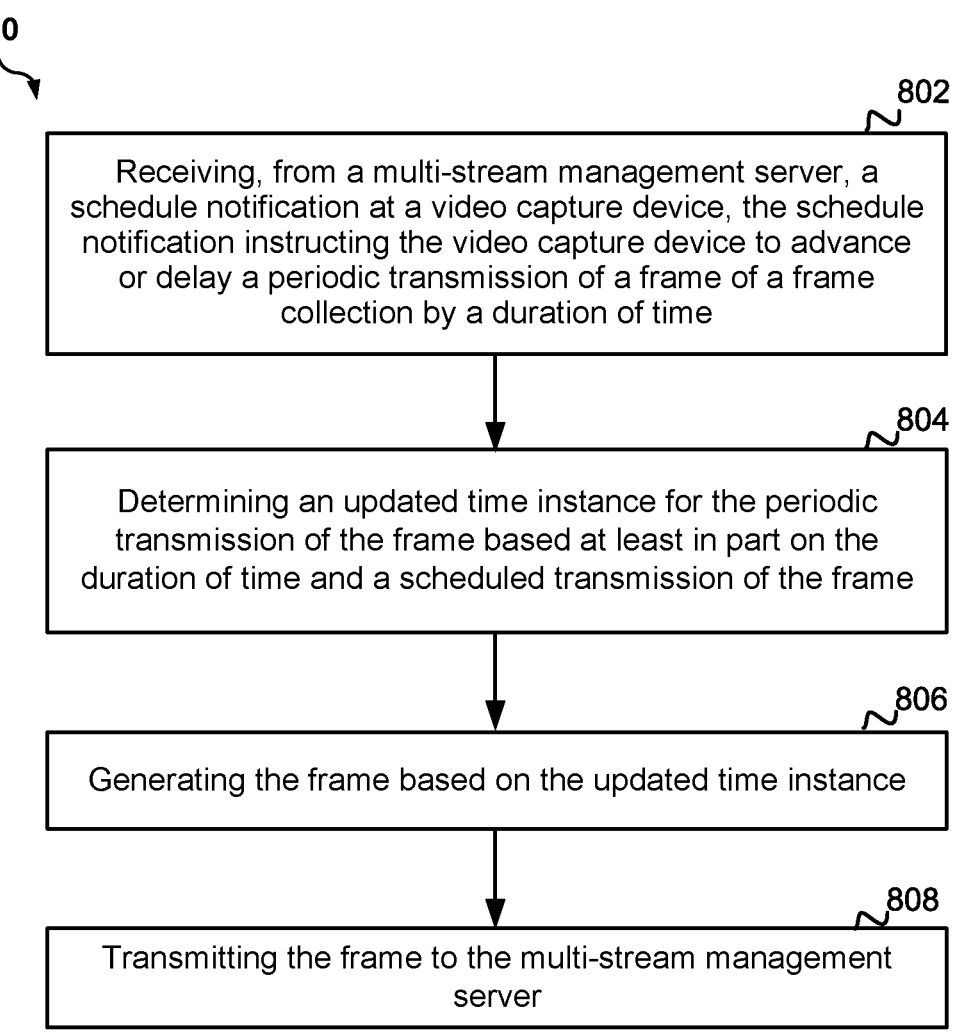

802

Receiving, from a multi-stream management server, a schedule notification at a video capture device, the schedule notification instructing the video capture device to advance or delay a periodic transmission of a frame of a frame collection by a duration of time

804

Determining an updated time instance for the periodic transmission of the frame based at least in part on the duration of time and a scheduled transmission of the frame

806

Generating the frame based on the updated time instance

808

Transmitting the frame to the multi-stream management server

*FIG. 8*

MULTI-STREAM PEAK BANDWIDTH DISPERSAL

FIELD OF TECHNOLOGY

The present disclosure relates generally to video capture systems, and more particularly, to methods and systems for multi-stream bandwidth dispersal within a video capture system.

BACKGROUND

In some closed-circuit television (CCTV) systems, a central server may continuously receive video streams from a plurality of networked cameras. For example, the networked cameras may transmit video data to the central server via a network switch. Further, many CCTV systems may be designed to account for an average bandwidth load, while failing to account for bandwidth peaks that may occur during streaming. For example, if two or more networked cameras transmit video data at full link speed to the central server, a reception link at the network switch may become saturated and buffers on the network switch will store excess packets until congestion has passed. However, if the congestion exceeds the network switch's buffer memory, the packets will be dropped. Additionally, retransmission of the dropped packets adds undesirable latency to system operation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for multi-stream bandwidth dispersal. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In an aspect, a method for multi-stream bandwidth dispersal may comprise receiving, via a communication network, a plurality of frame collections from a video capture device and one or more other video capture devices; detecting a congestion context based upon the plurality of frame collections; determining a schedule notification for the video capture device, the schedule notification providing instruction for transmitting a frame of a frame collection; and transmitting, via the communication network, the schedule notification to the video capture device.

In another aspect, a system for multi-stream bandwidth dispersal may comprise a memory storing instructions, and at least one processor coupled with the memory and configured by the instructions to receive, via a communication network, a plurality of frame collections from a video capture device and one or more other video capture devices; detect a congestion context based upon the plurality of frame collections; determine a schedule notification for the video capture device, the schedule notification providing instruction for transmitting a frame of a frame collection; and transmit, via the communication network, the schedule notification to the video capture device.

In another aspect, a non-transitory computer-readable medium storing instructions that cause a processor to receive, via a communication network, a plurality of frame collections from a video capture device and one or more other video capture devices; detect a congestion context based upon the plurality of frame collections; determine a schedule notification for the video capture device, the schedule notification providing instruction for transmitting a frame of a frame collection; and transmit, via the communication network, the schedule notification to the video capture device.

In an aspect, a method for multi-stream bandwidth dispersal may comprise receiving, from a multi-stream management server, a schedule notification at a video capture device, the schedule notification instructing the video capture device to advance or delay a periodic transmission of a frame of a frame collection by a duration of time; determining an updated time instance for the periodic transmission of the frame based at least in part on the duration of time and a scheduled transmission of the frame; generating the frame based on the updated time instance; and transmitting the frame to the multi-stream management server.

In another aspect, a system for multi-stream bandwidth dispersal may comprise a memory storing instructions, and at least one processor coupled with the memory and configured by the instructions to receive, from a multi-stream management server, a schedule notification at a video capture device, the schedule notification instructing the video capture device to advance or delay a periodic transmission of a frame of a frame collection by a duration of time; determine an updated time instance for the periodic transmission of the frame based at least in part on the duration of time and a scheduled transmission of the frame; generate the frame based on the updated time instance; and transmit the frame to the multi-stream management server.

In another aspect, a non-transitory computer-readable medium storing instructions that cause a processor to receive, from a multi-stream management server, a schedule notification at a video capture device, the schedule notification instructing the video capture device to advance or delay a periodic transmission of a frame of a frame collection by a duration of time; determine an updated time instance for the periodic transmission of the frame based at least in part on the duration of time and a scheduled transmission of the frame; generate the frame based on the updated time instance; and transmit the frame to the multi-stream management server.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 is a flow diagram of an example method of employing multi-stream bandwidth dispersal at a management device, according to some implementations.

FIG. 7 is block diagram of an example of a video capture device configured to implement multi-stream bandwidth dispersal, according to some implementations.

FIG. 8 is a flow diagram of an example method of employing multi-stream bandwidth dispersal at a video capture device, according to some implementations.

DETAILED DESCRIPTION

Figure 1:
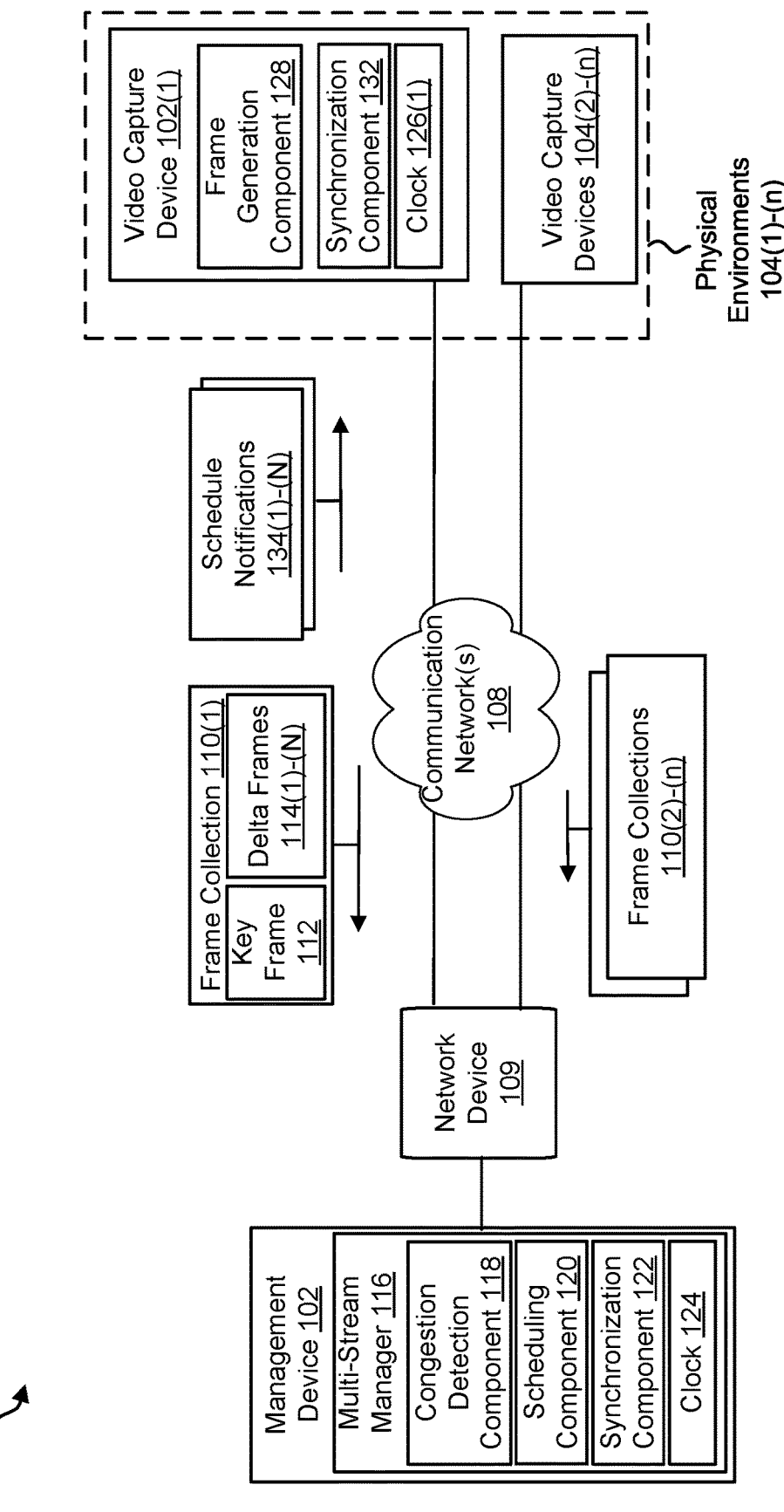
FIG. 1 is a block diagram of an example of a system for multi-stream bandwidth dispersal, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide multi-stream bandwidth dispersal. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one problem solved by the present solution is undesirable latency at a server receiving multiple video streams from a plurality of video capture sources. For example, the present disclosure describes systems and methods for multi-stream management configured to disperse receipt of video frames transmitted by a plurality of video capture devices in order to mitigate or reduce network congestion and/or packet loss. Typically, video capture devices periodically send frames to a server device. When frames of a certain type, e.g., key frames, overlap it may cause network congestion, which can cause additional latency as the frames may need to be retransmitted. Currently, video capture devices have no means for coordinating timing of frame transmissions. The present disclosure provides systems and methods for a management device to organize the video capture sources so that frames likely to cause packet loss should no longer conflict. In addition, the present disclosure reduces congestion without requiring more expensive network links or buffer memory to increase system capacity.

Referring to FIG. 1, in one non-limiting aspect, a system 100 may be configured to provide multi-stream bandwidth dispersal. As illustrated in FIG. 1, the system 100 may include a management device 102 and a plurality of video capture devices 104(1)-(n) configured to capture video in one or more physical environments 106(1)-(n). For example, the first video capture device 104(1) may capture video in a first physical environment 106(1), the nth video capture device 104(n) may capture video in an nth physical environment 106(n), and so forth. Further, the management device 102 and the plurality of video capture devices 104(1)-(n) may communicate via a communication network 108. In some implementations, the communication network 108 may include one or more of a wired and/or wireless private network, personal area network, local area network, wide area network, or the Internet. In addition, as illustrated in FIG. 1, in some aspects, the communication network 108 may include a network device 109 (e.g., an Ethernet switch) for coupling the management device 102 with the video capture devices 104(1)-(n).

As illustrated in FIG. 1, the video capture devices 104 (1)-(n) may capture video at the physical environments 106(1)-(n) and stream the captured video within a plurality of frame collections 110(1)-(n) via the communication network 108. In particular, each video capture device 104 may continuously generate a frame collection 110 from raw image data captured by the video capture device 104, and transmit the generated frame collection 110 to the management device 102. Some examples of protocols that may be used to transmit the frame collections 110 to the management device include real-time protocol, real-time stream protocol, etc.

Further, an individual frame collection 110 may include a key frame 112 and a plurality of delta frames 114(1)-(n) based on the key frame 112. In some aspects, the frames of a frame collection 110 may be generated in accordance with a frame rate parameter of a video capture device 104 with the frame rate parameter defining the frequency of frame generation of the frames of a frame collection 110. As used herein, in some aspects, a key frame may refer to a frame in which a complete image is encoded. Further, as used herein, in some aspects, a delta frame may refer to a frame that encodes changes in the image with respect to the key frame. As an example, a frame collection may be a group of pictures (GOP), a key frame may be an intra-coded frame (I-frame) that is encoded without dependency on any other frame, and a delta frame may be a predicted frame (P-frame) or bi-directional predicted picture (B-Frame) that is encoded with reference to an I-frame. In some aspects, the key frames 112 may be substantially larger than the delta frames 114, for example, a key frame may be 400 KB and a delta frame may be 7 KB. Additionally, the length of a frame collection 110 may refer to the number of frames between two key frames, and a key frame duration may refer to the frequency of key frame generation within a video stream of frame collections 110 transmitted by a video capture device 104. As described in detail herein, the management device 102 may manage the transmission of the plurality of frame collections 110 (1)-(n) by the video capture devices 104(1)-(n) to reduce congestion and packet loss. For example, the management device 102 may determine when each video capture device 104 operates in a key frame generation mode or a delta frame generation mode.

As illustrated in FIG. 1, the management device 102 may include a multi-stream manager 116 configured to manage transmission of the plurality of frame collections 110(1)-(n) by the video capture devices 104(1)-(n). The multi-stream manager 116 may include a congestion detection component 118 and a scheduling component 120. In some aspects, the congestion detection component 118 may be configured to detect and/or predict a congestion context at the management device 102 in response to the stream of data packets (e.g., the plurality of frame collections 110(1)-(n) received at the management device 102). As used herein, in some aspects, a "congestion context" may refer to an amount of frame data received at the management device 102 and/or network device exceeding a predefined value. Further, in some aspects, the multi-stream manager 116 may include a synchronization component 122 configured to synchronize a clock 124 of the management device 102 with the clocks 126(1)-(n) of the video capture devices 104(1)-(n).

Further, as illustrated in FIG. 1, a video capture device 104 may include a frame generation component 128 configured to continuously generate key frames 112 and delta frames 114 from raw image date captured at the video captured device 104. The video capture device 104 may also include a synchronization component 132 configured to synchronize a clock 126 of the video capture device 104 with the clock 124 of the management device 102 and the clocks 126 of the other video capture devices 104. In some aspects, the synchronization components 122 and 132 may employ a synchronization protocol (e.g., network time protocol (NTP)) to synchronize the clocks 124 and 126(1)-(n).

As described in detail herein, the scheduling component 120 may transmit a schedule notification 134 to the individual video capture devices 104. In some aspects, the schedule notification 134 provides instruction for transmitting a frame of a frame collection 110. In response to receipt of the schedule notification 134, a video capture device 104 may generate and transmit at least one frame collection 110 in accordance with the schedule notification.

For example, in some aspects, the management device 102 may receive the plurality of frame collections 110 from the video capture device 104(1) and one or more other video capture devices 104(2)-(n). In addition, as described with respect to FIG. 2, the congestion detection component 118 may detect a congestion context based upon the plurality of frame collections 110. For instance, the congestion detection component 118 may determine that a data size of a plurality of frames of the plurality of frame collections 110 received at the network device 109 exceeds a predefined value (e.g., a total capacity of a network link and a buffer memory of the network device 109). Further, the scheduling component 120 may generate a schedule notification 134 for the video capture device 104(1), and transmit the schedule notification 134 to the video capture device 104(1). As described in detail herein, the schedule notification 134 may provide instruction for transmitting a key frame and/or a delta frame of at least one frame collection 110 at a specific time instance in order to mitigate the congestion context.

In some aspects, the management device 102 and the video capture devices 104 may synchronize the clocks 124 and 126(1)-(n). Optionally, the management device 102 may configure a shared frame collection duration at each of the video capture devices 104(1)-(n). In some aspects, the management device 102 may employ configuration instruction (e.g., a real-time control protocol message) to set the shared frame collection duration and/or frame rate of the video capture devices 104(1)-(n). Further, the management device 102 may generate a schedule notification 134 for each video capture device 104. Further, the schedule notification 134 may include a timing offset indicating a period of time at which the particular video capture device 104 is instructed to enter a key frame generation mode and the plurality of other video capture devices are instructed to operate in a delta frame generation mode. For example the schedule notification 134(1) for the video capture device 104(1) may indicate a repeating time period wherein the video capture device 104(1) may transmit a key frame 112 and the other video capture devices 104(2)-(n) may transmit delta frames, and schedule notification 134(2) may indicate a repeating time period wherein the video capture device 104(2) may transmit a key frame and the other video capture devices 104(1) and 104(3)-(n) may transmit delta frames, and so forth. Further, the congestion detection component 118 and/or synchronization component 122 may monitor for drift by the management device 102 and/or any of the video capture devices 104(1)-(n), and trigger a resynchronization process among the devices of the system 100 and/or reissue updated schedule notifications 134 for transmitting the plurality of frame collection 110. Given that each video capture device 104 generates key frames 112 in accordance with a schedule determined by the management device 102, the management device 102 may be configured to ensure that the generation and transmission of the key frames 112 does not overlap or cause a congestion context, thereby preventing congestion and/or packet loss at the management device 102 and/or network device 109.

In some other aspects, the schedule notification 134 may be a transmission indication that instructs a video capture device 104 to enter the key frame generation mode. Further, the scheduling component 120 may provide the schedule notification 134 to the video capture devices 104(1)-(n) according to a scheduling protocol (e.g., round-robin scheduling protocol). For example, management device 102 may transmit the schedule notification 134(1) to the video capture device 104(1). In response to receipt of the schedule notification 134(1), the video capture device 104(1) may transition from transmitting delta frames 114 in the delta frame generation mode to the key frame generation mode. Once the video capture device 104(1) is in the key frame generation mode, the video capture device 104(1) may generate a key frame 112(1), transmit the key frame 112(1) to the management device 102, and transition back to the delta frame generation mode where the video capture device 104(1) is configured to generate and transmit delta frames 114. Upon receipt of the key frame 112(1), the management device 102 may transmit the schedule notification 134(2) to another video capture device, e.g., the video capture device 104(2). In response to receipt of the schedule notification 134(2), the video capture device 104(2) may transition from transmitting delta frames 114 in the delta frame generation mode to the key frame generation mode. Once the video capture device 104(2) is in the key frame generation mode, the video capture device 104(2) may generate a key frame 112(2), transmit the key frame 112(2) to the management device 102, and transition back to the delta frame generation mode where the video capture device 104(2) is configured to generate and transmit delta frames 114. Once all of the video capture devices 104(1)-(n) have received the schedule notification 134 and a transmitted a key frame 112, the management device 102 may repeat the process starting with the first video capture device 104(1). Given that each video capture device 104 generates key frames 112 on demand, the management device 102 may be configured to ensure that generating and transmitting the key frames 112 at the video capture devices 104(1)-(n) does not overlap or cause a congestion context, thereby preventing congestion and/or packet loss at the management device 102 and/or network device 109.

In yet still some other aspects, the schedule notification 134 may instruct a video capture device 104 to advance or delay a periodic transmission of a frame by a duration of time. Optionally, if the management device 102 determines that the video capture devices do not have a shared frame collection duration, the management device 102 may configure a shared frame collection duration at each of the video capture devices 104(1)-(n) before transmitting the schedule notifications 134 to advancing or delaying a periodic transmission of a frame by a duration of time. In some aspects, the management device 102 may employ configuration instruction (e.g., a real-time control protocol message) to set the shared frame collection duration and/or frame rate of the video capture devices 104(1)-(n).

The scheduling component 120 may determine the frame collection duration over which the video capture devices 104(1)-(n) will send an individual frame collection 110 (e.g., every video capture will transmit a key frame and the delta frames corresponding to the key frame within a one second period) and shift the generation of transmission of a frame of the frame collection within the frame collection duration so that the periodic transmission of the particular type of frame is advanced or delayed in future transmissions of the frame collections 110. For instance, the schedule notification 134 may advance or delay entering the key frame generation mode by a video capture device 104 during a frame collection duration. In some other instances, the schedule notification 134 may advance or delay generation and transmission of a delta frame 114 within the delta frame generation mode during a frame collection duration.

For example, the scheduling component 120 may receive a first frame from a video capture device 104(1). Further, the management device 102 may determine an expected time instance of a future generation and transmission of a second frame based at least in part on the receipt of the first frame. For example, the first frame may be a first key frame 112(1) and the management device 102 may determine the expected time instance at which a second key frame 112(2) will be transmitted by the video capture device 104(1) to the management device 102 based upon a known frame collection duration of the video capture device 104(1). Further, the scheduling component 120 may determine an expected congestion context at the management device 102 at the expected time instance, i.e., an amount of data expected to be received from the video capture devices 104 exceeds a predefined threshold at the expected time instance.

In response, the management device 102 may determine an updated time instance for generation and transmission of the second frame, and transmit a schedule notification 134 instructing the video capture device 104(1) to generate and transmit the frame at the updated time instance. For example, the congestion detection component 118 may predict that the expected transmission of a second key frame 112(2) by the first video capture device 104(1) will overlap with the expected transmission of a third key frame 112(3) by a second video capture device 104(2). In response, the management device 102 may modify the expected transmission of the second key frame 112(2) via the schedule notification 134. In particular, the management device 102 may advance or delay the expected transmission of the second key frame 112(2) so that the second key frame 112(2) no longer combines with the expected transmission of the third key frame 112(3) to contribute to the congestion context. If the advance or delay is less than the inter-frame delay (e.g. less than 50 millisecond (ms) for a 20 frames per second (FPS) video stream), the time until the next frame is generated is adjusted as required. However, if the advance or delay is larger than the inter-frame delay, then the frame collection length is adjusted. In other words, the video capture device 104 may generate more or less delta frames 114 than previously scheduled before the next key frame 112 is generated.

As another example, the first frame may be a delta frame 114(1) and the management device 102 may determine the expected time instance at which a second delta frame 114(2) will be transmitted by the video capture device 104(1) to the management device 102. Further, the congestion detection component 118 may predict that an amount of data expected to be received from the video capture devices 104 at the expected time instance is greater than a predefined threshold. In response, the management device 102 may modify the expected transmission of the second delta frame 112(2) via the schedule notification 134. In particular, the management device 102 may advance or delay the expected transmission of the second key frame 112(2) so that the second key frame 112(2) no longer combines with the other expected transmissions to contribute to the congestion context at the expected time instance. Given that each video capture device 104 generates key frames 112 and delta frames 114 in accordance with a schedule determined by the management device 102, the management device 102 may be configured to prevent congestion and/or packet loss at the management device 102 and/or network device 109 by dispersing generation and transmission of the frames of the frame collections 110. Further, nudging (i.e., advancing or delaying by a time duration) the video capture devices 104 using the schedule notification 134 eliminates the need for synchronizing the video capture devices 104, which may be cumbersome and inefficient. In addition, restricting management of the video capture devices 104 to nudging the video capture devices 104 with the schedule notification 134 minimizes or reduces network overhead.

In some aspects, the scheduling component 120 may further determine whether to advance or delay a periodic transmission of the frame by a duration of time based on an attribute of a video device. Some examples of attributes include whether a video capture device is capable of implementing a variable frame collection, video resolution, frame rate, an average size of key frames and/or delta frames received from a video capture device, one or more attributes of the physical environment where a video capture device is located (e.g., lighting, location, etc.), and/or a date and time of upcoming video capture by a video capture device 104. For instance, the management device 102 may transmit the schedule notification 134 to a first video capture device 102(1) instead of a second video capture device 104(2) because the second video capture device 104(2) is incapable of advancing or delaying frame generation. As another example, the management device 102 may predict an expected congestion context based on a historic size of key frames from a particular video capture device.

In some aspects, the management device 102 may employ machine learning and/or pattern matching techniques to detect the congestion context and/or determine the schedule notification 134.

Figure 2:
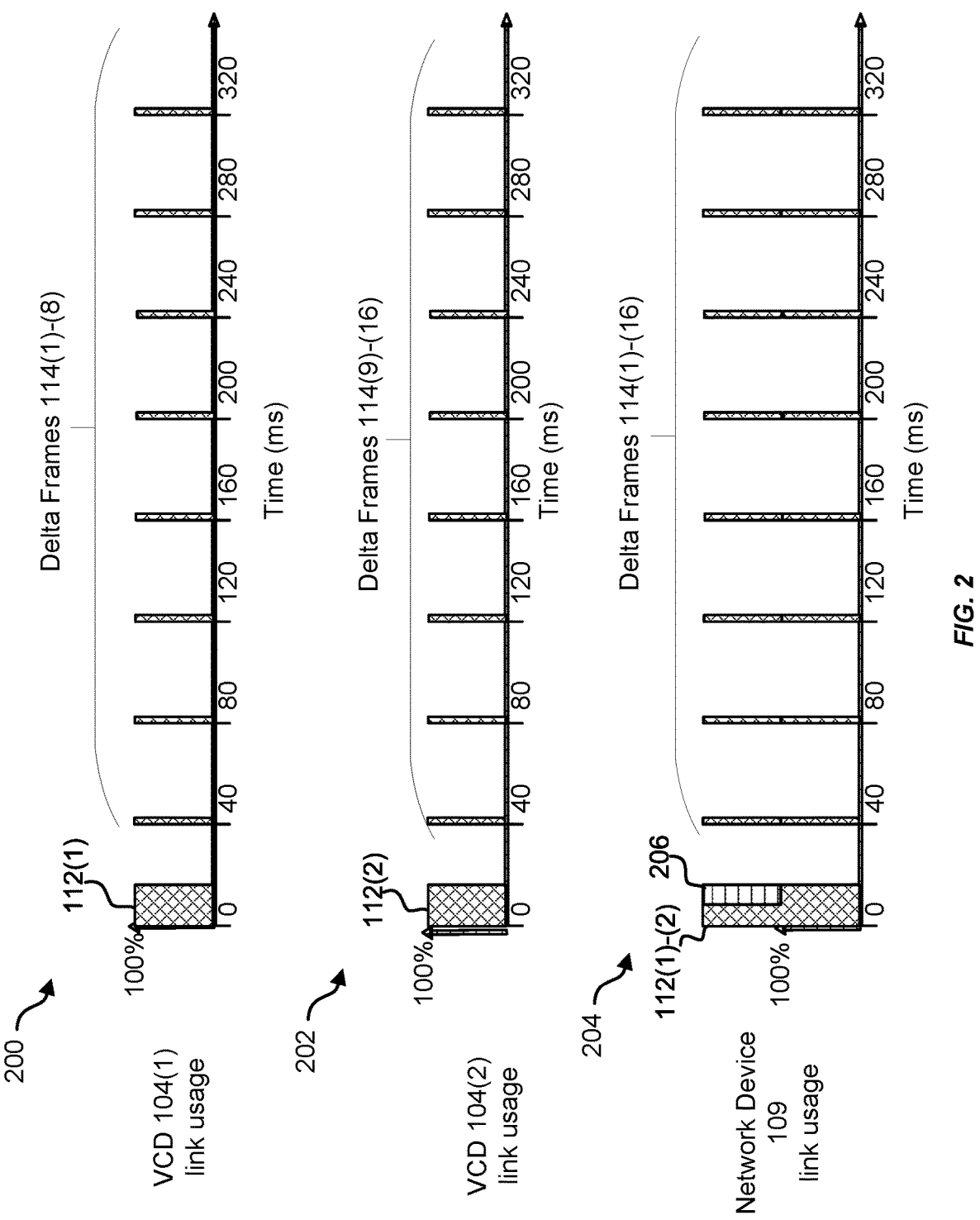
FIG. 2 is a first example of transmission and reception activity within a multi-stream activity, according to some implementations.

FIG. 2 illustrates a first example of activity at transmission and reception activity within a multi-stream activity, according to some implementations. As illustrated by the first bar graph 200, a first video capture device 104(1) may stream video by transmitting data packets every forty milliseconds for a period of three-hundred and sixty milliseconds. Further, each data packet transmitted during the period may include a frame of a frame collection 110(1) with the first frame being the key frame 112(1) of the frame collection 110(1) and the remaining frames being the delta frames 114(1)-(8). In addition, each data packet may consume 100% of a network link of the video capture device 104(1). As further illustrated by second bar graph 202, a second video capture device 104(2) may stream video by transmitting data packets every forty milliseconds for a period of three-hundred and sixty milliseconds. Further, each data packet transmitted during the period may include a frame of a frame collection 110(2) with the first frame being the key frame 112(2) of the frame collection 110(2) and the remaining frames being the delta frames 114(9)-(16). In addition, each data packet may consume 100% of the capacity of a network link of the video capture device 104(2). As further illustrated by a third bar graph 204, the management device 102 may receive the video stream of data packets every forty milliseconds for a period of three-hundred and sixty milliseconds from the first and second video capture devices 104(1)-(2). As shown in the third bar graph 204, receipt of the key frames 112(1)-(2) at the same time instance exceeds the capacity of a network link of the management device 102, thereby requiring the network device 109 to employ buffer memory to receive the key receipt of the key frames 112(1)-(2). Further, as illustrated by the portion of the frame 206, the buffer memory capacity may be exceeded thereby causing the management device 102 to drop the portion of the frame 206. In some aspects, the video capture device 104(2) may retransmit the key frame 112(2) to compensate for packet loss due to congestion, however loss avoidance is preferable over retransmission and the extra latency that retransmission introduces.

Figure 3:
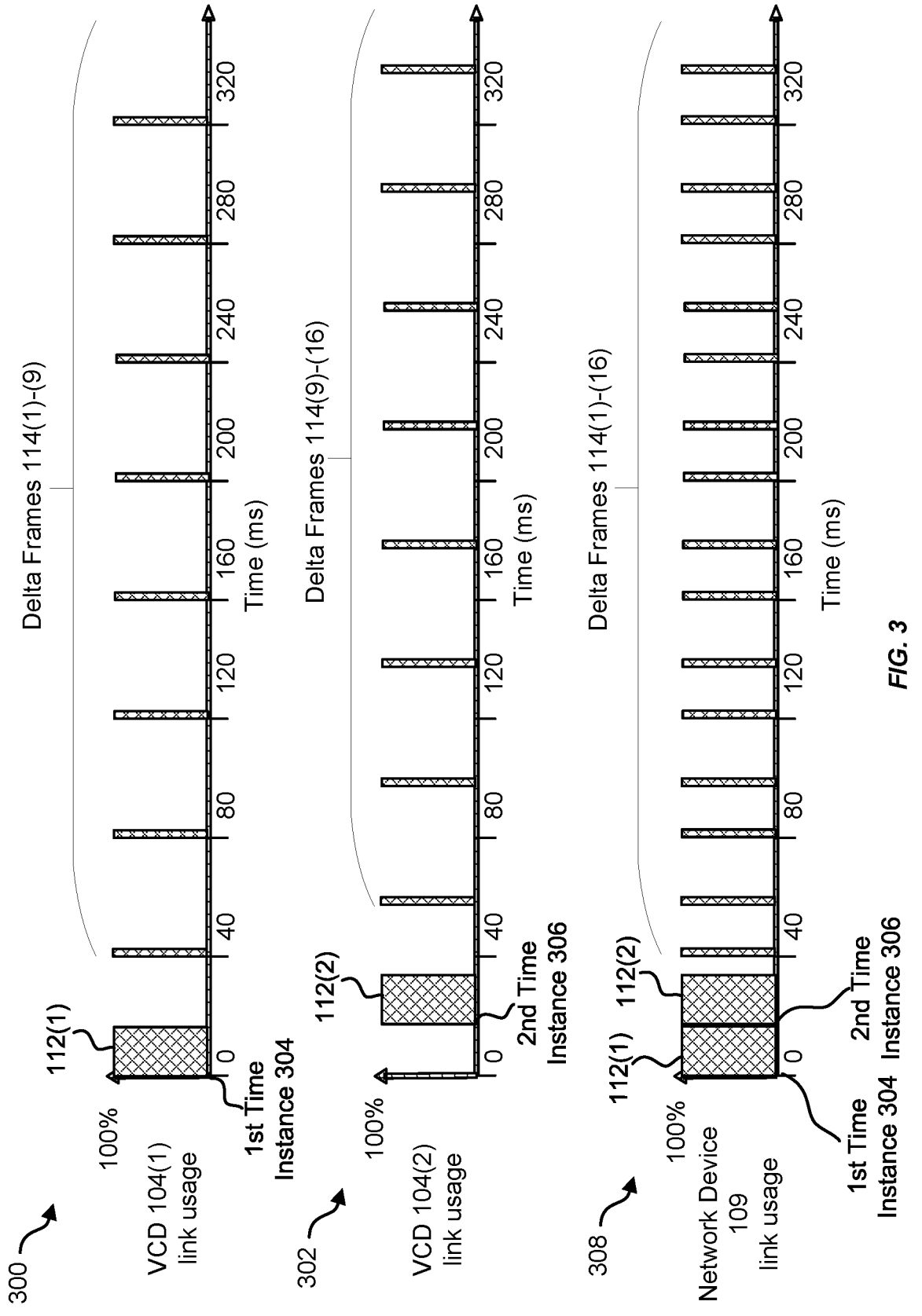
FIG. 3 illustrates a second example of transmission and reception activity within a multi-stream activity, according to some implementations.

FIG. 3 illustrates a second example of activity at transmission and reception activity within a multi-stream activity, according to some implementations. As illustrated by the first bar graph 300, a first video capture device 104(1) may stream video by transmitting data packets every forty milliseconds for a period of three-hundred and sixty milliseconds. Further, each data packet transmitted during the period may include a frame of a frame collection 110(1) with the first frame being the key frame 112(1) of the frame collection 110(1) and the remaining frames being the delta frames 114(1)-(8). In addition, each data packet may consume 100% of a network link of the video capture device 104(1). As further illustrated by second bar graph 302, a second video capture device 104(2) may stream video by transmitting data packets every forty milliseconds for a period of three-hundred and sixty milliseconds. Further, each data packet transmitted during the period may include a frame of a frame collection 110(2) with the first frame being the key frame 112(2) of the frame collection 110(2) and the remaining frames being the delta frames 114(9)-(16). In addition, each data packet may consume 100% of the capacity of a network link of the video capture device 104(2).

As described herein, the management device 102 may employ a schedule notification 134 instruct the video capture devices 104(1)-(2) to generate and transmit the key frames 112 of individual frame collection 110 transmitted by the video capture devices 104(1)-(2), respectively, at different time instances. For example, as illustrated in FIG. 3, one or more schedule notifications 134 may cause the video capture device 104(1) to transmit the first key frame 112(1) at a first time instance 304 within a repeating period and the video capture device 104(2) to transmit the second key frame 112(2) at a later time instance (i.e., the second time instance 306) within the repeating period.

As further illustrated by a third bar graph 308, the management device 102 may receive the video stream of data packets from the first and second video capture devices 104(1)-(2). As shown in the third bar graph 204, receipt of the key frames 112(1)-(2) at the does not exceed the capacity of a network link of the network device 109, and congestion is avoided because there is no overlap between receipt the key frames 112(1)-(2) due to scheduling the key frame generation modes of the first and second video capture devices 104(1)-(2) at the different time instances using one or more schedule notifications 134.

For example, the synchronization component 122 may synchronize the clock 124 of the management device 102 with the clocks 126(1)-(2) of the video capture devices 104(1)-(2), and the scheduling component 120 may transmit a schedule notification 134(1) instructing the video capture device 104(1) to generate and transmit the key frame 112(1) at a first time instance 304 based on a first offset value (e.g., zero milliseconds) relative to a reference time value and a schedule notification 134(2) instructing the video capture device 104(2) to generate and transmit the key frame 112(2) at a second time instance 306 based on a second offset value (e.g., fifteen milliseconds) from the reference time value. As another example, the scheduling component 120 may transmit a schedule notification 134 providing permission to the video capture device 104(1) to generate and transmit a key frame 112(1) at a first time instance 304, detect that the key frame 112(1) has been received, and transmit a schedule notification 134 providing permission to the video capture device 104(2) to generate and transmit a key frame 112(2) at a second time instance 306. As yet still another example, the scheduling component 120 may transmit a schedule notification 134 instructing the video capture device 104(2) to delay generation and transmission of the key frame 112(1) to the second time instance 306. Although FIGS. 2-3 reference only two video capture devices 104(1)-(2), two or more video capture devices 104 may be employed in accordance with the present invention.

Figure 4:
FIG. 4 illustrates a graphical representation of an example of multi-stream dispersal, according to some implementations.

FIG. 4 illustrates a graphical representation of a key frame generation mode of a plurality of video capture devices dispersed over a frame collection duration, according to some implementations. As described herein, a management device 102 may employ one or more schedule notifications 134 to coordinate key frame 112 transmission by a plurality of video capture devices 104. For example, the management device 102 may be coupled with eight video capture devices 104(1)-(8). Further, in some aspects, each video capture device 104 may transmit video data as frame collections 110(1)-(n) via one or more links of a network device 109. As illustrated in FIG. 4, the management device 102 may disperse the transmission of key frames 112 by the video capture devices 104(1)-(8) to avoid network congestion. In particular, the management device 102 may ensure that receipt of the individual key frames 112(1)-(8) transmitted by the video capture devices 104(1)-(8) during each collection frame period does not overlap, as illustrated in FIG. 4.

For example, as described herein, the management device 102 may transmit to each a video capture device 104 a schedule notification 134 including a timing offset indicating a period of time at which the video capture device is instructed to enter a key frame generation mode and the plurality of other video capture devices are instructed to operate in a delta frame generation mode. In some other examples, the management device 102 may transmit a schedule notification 134 including a transmission indication instructing the receiving video capture device 104 to enter the key frame generation mode in a round robin process. In yet still some other examples, the management device 102 may transmit schedule notifications 134 to the video capture devices 104 including an instruction to a video capture device 104 to advance or delay a periodic transmission of the frame by a duration of time so that the a key frame generation mode of the video capture device 104 does not overlap with a key frame generation mode at any other video capture device 104.

Figure 5:
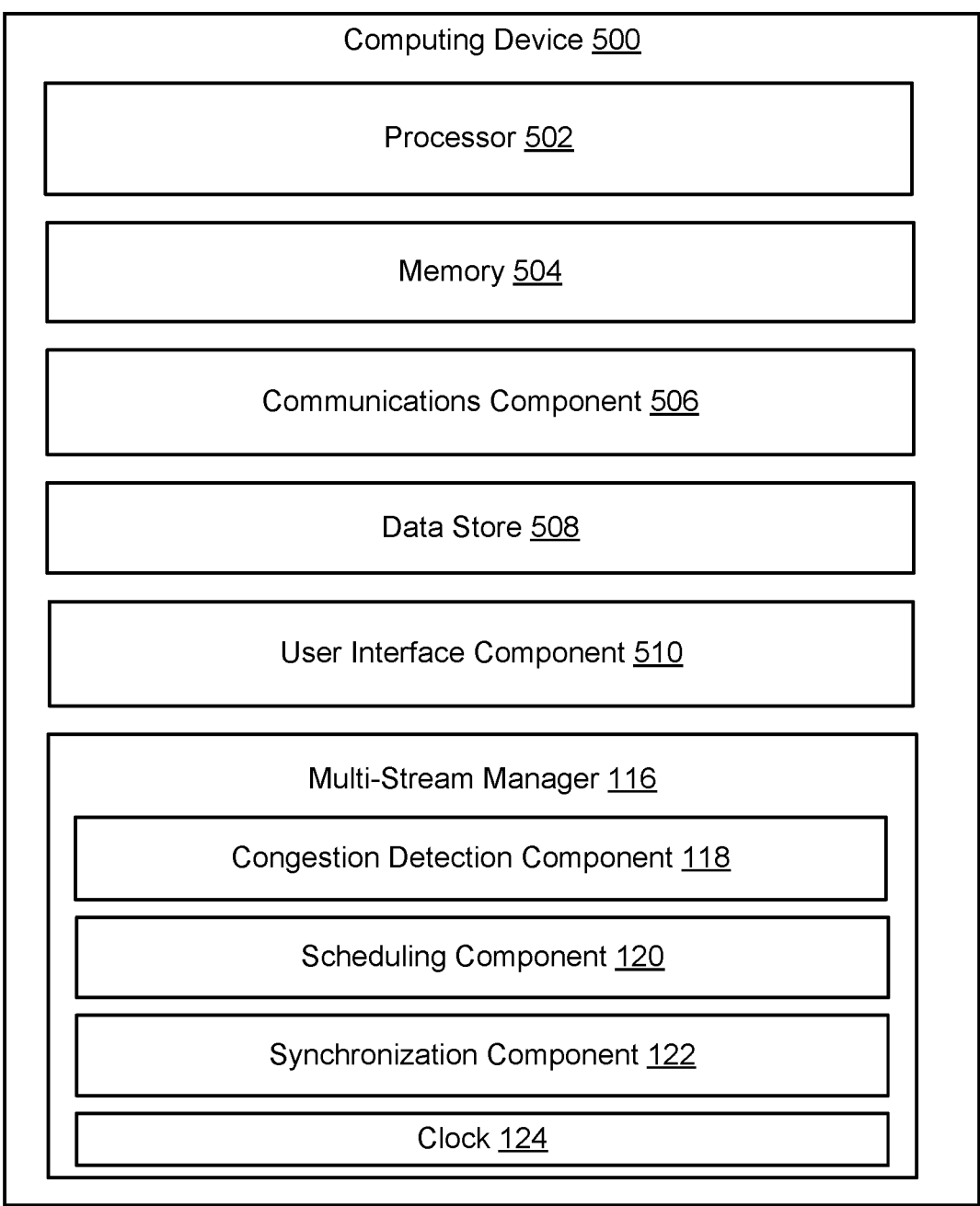
FIG. 5 is block diagram of an example of a management device configured to implement multi-stream bandwidth dispersal, according to some implementations.

Referring to FIG. 5, a computing device 500 may implement all or a portion of the functionality described herein. The computing device 500 may be or may include or may be configured to implement the functionality of at least a portion of the system 100, or any component therein. For example, the computing device 500 may be or may include or may be configured to implement the functionality of the management device 102. The computing device 500 includes a processor 502 which may be configured to execute or implement software, hardware, and/or firmware modules that perform any functionality described herein. For example, the processor 502 may be configured to execute or implement software, hardware, and/or firmware modules that perform any functionality described herein with reference to the management device 102, or any other component/system/device described herein, e.g., the multi-stream manager 116, the congestion detection component 118, the scheduling component 120, and/or the synchronization component 122.

The processor 502 may be a micro-controller, an application-specific integrated circuit (ASIC), a digital signal processor (DSP), or a field-programmable gate array (FPGA), and/or may include a single or multiple set of processors or multi-core processors. Moreover, the processor 502 may be implemented as an integrated processing system and/or a distributed processing system. The computing device 500 may further include a memory 504, such as for storing local versions of applications being executed by the processor 502, related instructions, parameters, etc. The memory 504 may include a type of memory usable by a computer, such as random access memory (RANI), read only memory (ROM), tapes, magnetic discs, optical discs, volatile memory, non-volatile memory, and any combination thereof. Additionally, the processor 502 and the memory 504 may include and execute an operating system executing on the processor 502, one or more applications, display drivers, and/or other components of the computing device 500, e.g., the multi-stream manager 116, the congestion detection component 118, the scheduling component 120, and/or the synchronization component 122.

Further, the computing device 500 may include a communications component 506 that provides for establishing and maintaining communications with one or more other devices, parties, entities, etc. utilizing hardware, software, and services. The communications component 506 may carry communications between components on the computing device 500, as well as between the computing device 500 and external devices, such as devices located across a communications network and/or devices serially or locally connected to the computing device 500. In an aspect, for example, the communications component 506 may include one or more buses, and may further include transmit chain components and receive chain components associated with a wireless or wired transmitter and receiver, respectively, operable for interfacing with external devices.

Additionally, the computing device 500 may include a data store 508, which can be any suitable combination of hardware and/or software, that provides for mass storage of information, databases, and programs. For example, the data store 508 may be or may include a data repository for applications and/or related parameters not currently being executed by processor 502. In addition, the data store 508 may be a data repository for an operating system, application, display driver, etc., executing on the processor 502, and/or one or more other components of the computing device 500, e.g., the multi-stream manager 116, the congestion detection component 118, the scheduling component 120, and/or the synchronization component 122.

The computing device 500 may also include a user interface component 510 operable to receive inputs from a user of the computing device 500 and further operable to generate outputs for presentation to the user (e.g., via a display interface to a display device). The user interface component 510 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 510 may include one or more output devices, including but not limited to a display interface, a speaker, a haptic feedback mechanism, a printer, any other mechanism capable of presenting an output to a user, or any combination thereof.

Referring to FIG. 6, in operation, the management device 102 or computing device 500 may perform an example method 600 for employing multi-stream bandwidth dispersal at a management device. The method 600 may be performed by one or more components of the management device 102, the computing device 500, or any device/component described herein according to the techniques described with reference to the previous figures.

At block 602, the method 600 receiving, via a communication network, a plurality of frame collections from a video capture device and one or more other video capture devices. For example, the multi-stream manager 116 may receive the plurality of frame collection 110(1)-(n) from the plurality of video capture devices 104(1)-(n). In some aspects, the plurality of frame collection 110 (1)-(N) may be a plurality of frame collections. Accordingly, the management device 102 or the processor 502 executing the multi-stream manager 116 may provide means for receiving, via a communication network, a plurality of frame collections from a video capture device and one or more other video capture devices.

At block 604, the method 600 includes detecting a congestion context based upon the plurality of frame collections. For example, the congestion detection component 118 may be configured to detect and/or predict a congestion context at the management device 102 in response to the stream of data packets (e.g., the plurality of frame collections) received at the management device 102. For instance, the congestion detection component 118 may detect or predict two or more frames received at the management device 102 having a data size that exceeds the network link capacity and the buffer memory capacity, as illustrated in FIG. 2. Accordingly, the management device 102 or the processor 502 executing the congestion detection component 118 may provide means for detecting a congestion context based upon the plurality of frame collections.

At block 606, the method 600 includes determining a schedule notification for the video capture device, the schedule notification providing instruction for transmitting a frame of a frame collection. For example, the scheduling component 120 may generate a schedule notification for the video capture device 104(1). In some examples, the schedule notification 134 may include a timing offset indicating a period of time at which the video capture device is instructed to enter a key frame generation mode and the plurality of other video capture devices are instructed to operate in a delta frame generation mode. In some other examples, the schedule notification 134 may be a transmission indication that instructs a video capture device 104 to enter the key frame generation mode. In yet still some other examples, the schedule notification 134 may instruct the video capture device 104 to advance or delay a periodic transmission of the frame by a duration of time. In some aspects, the frame may be a key frame. Alternatively, in some other aspects, the frame may be a delta frame based on a key frame. Further, in some instances, the management device 102 may determine the schedule notification 134 in response to detecting the congestion context.

Accordingly, the management device 102 or the processor 502 executing the scheduling component 120 may provide means for includes determining a schedule notification for the video capture device, the schedule notification providing instruction for transmitting a frame of a frame collection.

At block 608, the method 600 includes transmitting, via the communication network, the schedule notification to the video capture device. For example, the scheduling component 120 may transmit the schedule notification 134 to the video capture device 104. Accordingly, the management device 102 or the processor 502 executing the scheduling component 120 may provide means for transmitting, via the communication network, the schedule notification to the video capture device.

In an alternative or additional aspect, in order to determine the schedule notification for the video capture device, the method 600 comprises determining the schedule notification based at least in part on an attribute of the video capture device. Accordingly, the management device 102 or the processor 502 executing the scheduling component may provide means for determining the schedule notification based at least in part on an attribute of the video capture device.

Referring to FIG. 7, a computing device 700 may implement all or a portion of the functionality described herein. The computing device 700 may be or may include or may be configured to implement the functionality of at least a portion of the system 100, or any component therein. For example, the computing device 700 may be or may include or may be configured to implement the functionality of the video capture devices 104. The computing device 700 includes a processor 702 which may be configured to execute or implement software, hardware, and/or firmware modules that perform any functionality described herein. For example, the processor 702 may be configured to execute or implement software, hardware, and/or firmware modules that perform any functionality described herein with reference to the video capture device 104, or any other component/system/device described herein, e.g., the frame generation component 128, and/or the synchronization component 132.

The processor 702 may be a micro-controller, an application-specific integrated circuit (ASIC), a digital signal processor (DSP), or a field-programmable gate array (FPGA), and/or may include a single or multiple set of processors or multi-core processors. Moreover, the processor 702 may be implemented as an integrated processing system and/or a distributed processing system. The computing device 700 may further include a memory 704, such as for storing local versions of applications being executed by the processor 702, related instructions, parameters, etc. The memory 704 may include a type of memory usable by a computer, such as random access memory (RANI), read only memory (ROM), tapes, magnetic discs, optical discs, volatile memory, non-volatile memory, and any combination thereof. Additionally, the processor 702 and the memory 704 may include and execute an operating system executing on the processor 702, one or more applications, display drivers, and/or other components of the computing device 700.

Further, the computing device 700 may include a communications component 706 that provides for establishing and maintaining communications with one or more other devices, parties, entities, etc. utilizing hardware, software, and services. The communications component 706 may carry communications between components on the computing device 700, as well as between the computing device 700 and external devices, such as devices located across a communications network and/or devices serially or locally connected to the computing device 700. In an aspect, for example, the communications component 706 may include one or more buses, and may further include transmit chain components and receive chain components associated with a wireless or wired transmitter and receiver, respectively, operable for interfacing with external devices.

Additionally, the computing device 700 may include a data store 708, which can be any suitable combination of hardware and/or software, that provides for mass storage of information, databases, and programs. For example, the data store 708 may be or may include a data repository for applications and/or related parameters not currently being executed by processor 702. In addition, the data store 708 may be a data repository for an operating system, application, display driver, etc., executing on the processor 702, and/or one or more other components of the computing device 700, e.g., the frame generation component 128, and/or the synchronization component 132.

The computing device 700 may also include a user interface component 710 operable to receive inputs from a user of the computing device 700 and further operable to generate outputs for presentation to the user (e.g., via a display interface to a display device). The user interface component 710 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 710 may include one or more output devices, including but not limited to a display interface, a speaker, a haptic feedback mechanism, a printer, any other mechanism capable of presenting an output to a user, or any combination thereof.

Referring to FIG. 8, in operation, the video capture device 104 or computing device 700 may perform an example method 800 for employing multi-stream bandwidth dispersal at a video capture device. The method 800 may be performed by one or more components of the video capture device 104, the computing device 700, or any device/component described herein according to the techniques described with reference to the previous figures.

At block 802, the method 800 includes receiving, from a multi-stream management server, a schedule notification at a video capture device, the schedule notification instructing the video capture device to advance or delay a periodic transmission of a frame of a frame collection by a duration of time. For example, the video capture device 104(1) may receive a schedule notification 134 from the management device 102. Further, the video capture device 104(1) may share a common collection frame duration with the plurality of other video capture devices 104(2)-(n), and the schedule notification 134 may instruct the video capture device 104 to delay a periodic transmission of the frame within the collection frame duration by a period of time, e.g., 25 ms.

Accordingly, the video capture device 104 or the processor 702 executing the frame generation component 128 may provide means for receiving, from a multi-stream management server, a schedule notification at a video capture device, the schedule notification instructing the video capture device to advance or delay a periodic transmission of a frame of a frame collection by a duration of time.

At block 804, the method 800 includes determining an updated time instance for the periodic transmission of the frame based at least in part on the duration of time and a scheduled transmission of the frame. For example, prior to the receipt of the schedule notification 134, the video capture device 104(1) may have been configured to transmit the frame at a first time instance. Further, upon receipt of the schedule notification, the video capture device 104(1) may determine a second time instance for generating and transmitting the frame by advancing or delaying the first time instance by the time duration. For instance, video capture device 104(1) may initially have been configured to generate and/or stream the frame at the 0 ms of a 360 ms collection frame period, and the delay the periodic transmission of the frame to the 25 ms of the 360 ms collection frame period.

Accordingly, the video capture device 104 or the processor 702 executing the frame generation component 128 may provide means for determining an updated time instance for the periodic transmission of the frame based at least in part on the duration of time and a scheduled transmission of the frame.

At block 806, the method 800 generating the frame based on the updated time instance.

For example, the frame generation may generate a key frame 112(1) or a delta frame 114(1) at the 25 ms of the 360 ms collection frame period. Accordingly, the video capture device 104 or the processor 702 executing the frame generation component 128 may provide means for generating the frame based on the updated time instance.

At block 808, the method 800 includes transmitting the frame to the multi-stream management server. For example, the video capture device 104(1) may stream the key frame 112(1) or the delta frame 114(1) to the management device 102. Accordingly, the video capture device 104 or the processor 702 executing the communications components 706 may provide means transmitting the frame to the multi-stream management server.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of multi-stream management, the method comprising:

receiving, at a management device via a communication network, a plurality of frame collections from a video capture device and one or more other video capture devices;

detecting, by the management device in response to receipt of the plurality of frame collections, a congestion context that specifies an amount of frame data received from the video capture device and the one or more other video capture devices at a particular time instance by the management device exceeding a predefined value, wherein the frame data corresponds to a plurality of frames of the plurality of frame collections received or expected to be received at a particular time instance;

determining, based at least in part on detecting the congestion context, a schedule for the video capture device and the one or more other video capture devices, the schedule providing instructions for transmitting respective ones of key frames and non-key frames of a frame collection from the video capture device and the one or more other video capture devices to the management device without an overlap that causes the congestion context to exceed the predefined value, wherein the schedule avoids the congestion context from exceeding the predefined value by selectively advancing or delaying a transmission of at least a non-key frame of the frame collection by a duration of time by selectively advancing or delaying entering a non-key frame generating mode by at least one of the video capture device and the one or more other video capture devices; and transmitting, by the management device via the communication network, the schedule to the video capture device and the one or more other video capture devices.

2. The method of claim 1, further comprising receiving, via the communication network, at least the non-key frame of the frame collection based on the schedule.

3. The method of claim 1, wherein the predefined value includes a buffer size of the management device.

4. The method of claim 1, wherein the schedule includes a timing offset indicating a period of time at which the video capture device is instructed to enter a key frame generation mode and the one or more other video capture devices are instructed to operate in a delta frame generation mode, and further comprising performing a clock synchronization process between the video capture device and the one or more other video capture devices.

5. The method of claim 1, wherein a key frame of the frame collection is a second key frame, the schedule is a transmission indication that provides permission to enter a key frame generation mode from a delta frame generation mode, and determining the schedule for the video capture device comprises:

transmitting the schedule to another video capture device of the one or more other video capture devices; and determining that the another video capture device has completed transmission of a first key frame, the transmission in response to an earlier receipt of the schedule.

6. The method of claim 1, wherein the non-key frame is a second frame, the schedule instructs the video capture device to advance or delay the transmission of the non-key frame by the duration of time, and determining the schedule for the video capture device comprises:

determining an expected time instance of the transmission based on receipt of a first frame from the video capture device;

determining, based on the first frame and the plurality of frame collections, that a first expected congestion value at the expected time instance is above a first predefined threshold; and predicting that a second expected congestion value at an updated time instance is below a second predefined threshold, the updated time instance differing from the expected time instance by the duration of time.

7. The method of claim 1, wherein determining the schedule for the video capture device comprises determining the schedule based at least in part on an attribute of at least one of the video capture device and the one or more other video capture devices.

8. The method of claim 1, wherein selectively advancing or delaying the transmission of at least the non-key frame comprises selectively advancing or delaying a generation and the transmission of at least the non-key frame by the duration of time.

9. The method of claim 1, wherein the transmission of at least the non-key frame is selectively advanced or delayed responsive to a current frame type generation mode of a transmitting one of the video capture device or one of the one or more other video capture devices.

10. The method of claim 1, wherein an advancement or a delay of at least the non-key frame is performed to alter a periodic transmission of at least the non-key frame.

11. The method of claim 1, wherein the duration of time is set to a predefined offset value from among a plurality of predefined offset values.

12. The method of claim 11, wherein two different predefined offset values from among the plurality of predefined offset values are used to separate respective transmissions of two different frames.

13. The method of claim 11, wherein each of the plurality of predefined offset values corresponds to a respective start time to begin frame generation followed by transmission of the respective ones of key frames and non-key frames of the frame collection, by the video capture device and the one or more other video capture devices to the management device.

14. The method of claim 1, wherein the schedule selectively advances or delays an expected generation of the non-key frame so that the non-key frame no longer combines with an expected transmission of another frame to contribute to the congestion context.

15. The method of claim 1, wherein the schedule includes a predefined timing offset from among a plurality of predefined timing offsets, and wherein the predefined timing offset indicates a period of time at which the video capture device is instructed to enter a key frame generation mode and the one or more other video capture devices are instructed to operate in a non-key frame generation mode.

16. A management system comprising:

a memory storing instructions thereon; and at least one processor coupled with the memory and configured by the instructions to:

receive, via a communication network, a plurality of frame collections from a video capture device and one or more other video capture devices;

detect, in response to receipt of the plurality of frame collections, that specifies an amount of frame data received from the video capture device and the one or more other video capture devices at a particular time instance by the management system exceeding a predefined value, wherein the frame data corresponds to a plurality of frames of the plurality of frame collections received or expected to be received at a particular time instance;

determine, based at least in part on detecting the congestion context, a schedule for the video capture device and the one or more other video capture devices, the schedule providing instructions for transmitting respective ones of key frames and non-key frames of a frame collection from the video capture device and the one or more other video capture devices to the management system without an overlap that causes the congestion context to exceed the predefined value, wherein the schedule avoids the congestion context from exceeding the predefined value by selectively advancing or delaying a transmission of at least a non-key frame of the frame collection by a duration of time by selectively advancing or delaying entering a non-key frame generating mode by at least one of the video capture device and the one or more other video capture devices; and transmit, via the communication network, the schedule to the video capture device and the one or more other video capture devices.

17. The management system of claim 16, wherein the at least one processor is further configured by the instructions to receive, via the communication network, at least the non-key frame of the frame collection based on the schedule.

18. The management system of claim 16, wherein the schedule includes a timing offset indicating a period of time at which the video capture device is instructed to enter a key frame generation mode and the one or more other video capture devices are instructed to operate in delta frame generation mode, and further comprising performing a clock synchronization process between the video capture device and the one or more other video capture devices.

19. The management system of claim 16, wherein a key frame of the frame collection is a second key frame, the schedule is a transmission indication that provides permission to enter a key frame generation mode from a delta frame generation mode, and to determine the schedule for the video capture device, the at least one processor is configured by the instructions to:

transmit the schedule to another video capture device of the one or more other video capture devices; and determine that the another video capture device has completed transmission of a first key frame, the transmission in response to an earlier receipt of the schedule.

20. The management system of claim 16, wherein the non-key frame is a second frame, the schedule instructs the video capture device to advance or delay the transmission of at least the non-key frame by the duration of time, and to determine the schedule for the video capture device, the at least one processor is configured by the instructions to:

determine an expected time instance of the transmission based on receipt of a first frame from the video capture device;

determine, based on the first frame and the plurality of frame collections, that a first expected congestion value at the expected time instance is above a first predefined threshold; and predict that a second expected congestion value at an updated time instance is below a second predefined threshold, the updated time instance differing from the expected time instance by the duration of time.

21. The management system of claim 16, wherein to determine the schedule for the video capture device, the at least one processor is configured by the instructions to determine the schedule based at least in part on an attribute of at least one of the video capture device and the one or more other video capture devices.

22. A non-transitory computer-readable device having instructions thereon that, when executed by at least one computing device, causes the at least one computing device to perform operations comprising:

receiving, from a multi-stream management server, a schedule notification at a video capture device, the schedule notification being in accordance with a scheduling protocol that is based on a congestion context that specifies an amount of frame data received from a video capture device and one or more other video capture devices at a particular time instance by the multi-stream management server exceeding a predefined value, wherein the schedule notification avoids the congestion context from exceeding the predefined value by selectively advancing or delaying a transmission of at least a non-key frame of a frame collection by the predefined a duration of time by selectively advancing or delaying entering a non-key frame generating mode by at least one of the video capture device and the one or more other video capture devices;

determining an updated time instance for the transmission of at least the non-key frame based at least in part on the duration of time and a scheduled transmission of at least the non-key frame;

generating at least the non-key frame based on the updated time instance; and transmitting at least the non-key frame to the multi-stream management server.

23. The non-transitory computer-readable device of claim 22, wherein the non-key frame is a delta frame, and determining the updated time instance for the transmission of at least the non-key frame comprises determining an updated frame collection duration defining transmission of a plurality of delta frames including the delta frame by the video capture device.

*   *   *   *   *